(12) United States Patent
Jin (10) Patent No.: US 10,360,748 B2
(45) Date of Patent: Jul. 23, 2019

(54) METHOD OF ACHIEVING FREE-PAIRING WIRELESS DOOR LOCK BASED ON DIP SWITCH, A WIRELESS DOOR LOCK AND A COMMUNICATION METHOD FOR THE WIRELESS DOOR LOCK

(71) Applicant: Q & K International Group Limited, Grand Cayman (KY)

(72) Inventor: Guangjie Jin, Shanghai (CN)

(73) Assignee: Q & K International Group Limited, Grand Cayman (KY)

( * ) Notice: Subject to any disclaimer, the term of this patent is extended or adjusted under 35 U.S.C. 154(b) by 0 days.

(21) Appl. No.: 16/021,523

(22) Filed: Jun. 28, 2018

(65) Prior Publication Data

US 2019/0051078 A1    Feb. 14, 2019

(30) Foreign Application Priority Data

Aug. 14, 2017    (CN) .......................... 2017 1 0691614

(51) Int. Cl.
| | | |
|---|---|---|
| *H04Q 5/22* | (2006.01) | |
| *G05B 19/02* | (2006.01) | |
| *G07C 9/00* | (2006.01) | |

(52) U.S. Cl.
CPC ..... *G07C 9/00817* (2013.01); *G07C 9/00309* (2013.01); *G07C 9/00857* (2013.01); *G05B 19/02* (2013.01); *G07C 2009/00404* (2013.01); *G07C 2009/00825* (2013.01); *G07C 2009/00865* (2013.01); *H04Q 5/22* (2013.01)

(58) Field of Classification Search
CPC ............ G07C 9/00; H04L 29/08; H04W 4/00; H04Q 5/22

USPC ................... 340/5.22, 5.61, 825.21; 370/516
See application file for complete search history.

(56) References Cited

U.S. PATENT DOCUMENTS

| | | | | |
|---|---|---|---|---|
| 4,750,118 A | * | 6/1988 | Heitschel ........... | G05B 19/0425 340/12.5 |
| 5,805,926 A | * | 9/1998 | Le Van Suu ......... | G05B 19/042 710/16 |
| 5,945,936 A | * | 8/1999 | Issa ..................... | B60R 25/1004 340/12.23 |
| 7,545,833 B2 | * | 6/2009 | Chau .................. | G07C 9/00182 340/12.5 |
| 7,639,155 B2 | * | 12/2009 | Gauthier ................ | G08C 17/02 340/10.32 |

(Continued)

*Primary Examiner* — Nam V Nguyen
(74) *Attorney, Agent, or Firm* — Hogan Lovells US LLP (57) ABSTRACT

Provided are a method of achieving free-pairing wireless door lock based on DIP switch, a wireless door lock and a communication method for the wireless door lock. The method of achieving free-pairing wireless door lock based on DIP switch specifically includes: step 1, selecting for a wireless door lock a wireless chip which supports data modulation, wherein a data field of a transmission packet includes a lock address bit field and an area code field; step 2, providing, a built-in multi-bit DIP switch for the wireless door lock in terms of hardware, in which case the multi-bit DIP switch is directly connected with an input pin of the central processing unit of the wireless door lock; step 3, installing an embedded software in central processing unit of the wireless door lock; and step 4, matching a DIP switch address with a room number during installation of the wireless door lock.

14 Claims, 4 Drawing Sheets

(56) References Cited

U.S. PATENT DOCUMENTS

| | | | | |
|---|---|---|---|---|
| 8,325,008 B2* | 12/2012 | Keller, Jr. | ............... | G08C 19/28 |
| | | | | 340/5.64 |
| 8,724,036 B2* | 5/2014 | Seo | ...................... | H04N 5/4403 |
| | | | | 340/12.24 |
| 9,390,572 B2* | 7/2016 | Almomani | ......... | G07C 9/00309 |
| 9,406,181 B2* | 8/2016 | Almomani | ......... | G07C 9/00309 |
| 10,068,464 B2* | 9/2018 | Devlin | ................... | G08C 17/02 |
| 2005/0024228 A1* | 2/2005 | Vignon | .............. | G07C 9/00182 |
| | | | | 340/9.16 |
| 2005/0225428 A1* | 10/2005 | Autret | ................ | G07C 9/00857 |
| | | | | 340/5.22 |
| 2014/0028438 A1* | 1/2014 | Kuenzi | .............. | G07C 9/00817 |
| | | | | 340/5.24 |

* cited by examiner

| Room No. | Lock Address Bit | Area Code | Multi-bit DIP switch |
|---|---|---|---|
| Room No. 01 | 0x01 | 0x01 |  |
| Room No.02 | 0x02 | 0x01 |  |
| Room No.03 | 0x03 | 0x01 |  |
| Room No.07 | 0x07 | 0x01 |  |

METHOD OF ACHIEVING FREE-PAIRING WIRELESS DOOR LOCK BASED ON DIP SWITCH, A WIRELESS DOOR LOCK AND A COMMUNICATION METHOD FOR THE WIRELESS DOOR LOCK

CROSS-REFERENCE TO RELATED APPLICATIONS

The present disclosure claims the priority to the Chinese patent application No. 201710691614.2, entitled "A Method of Achieving Free-pairing Wireless Door Lock Based on DIP switch", filed with SIPO on Aug. 14, 2017, and all contents of which is incorporated herein by reference.

BACKGROUND

The present disclosure relates to the technical field of wireless door lock, and particularly to a method of achieving free-pairing wireless door lock based on DIP (Double In-line Package) switch, a wireless door lock and a communication method for the wireless door lock.

Wireless door lock is a lock that can be remotely controlled via wireless communication. A wireless door lock is generally capable of networking. A networking system includes multiple wireless door locks and wireless communication concentrators. Control information or instructions can be sent via the wireless concentrators to each of the wireless door locks, so as to remotely control the wireless door locks to have a door locked, unlocked or otherwise.

However, during wireless transmission, a receiver can only identify a request from one transmitter at one time. If there are multiple transmitters transmitting data at the same time, it may cause the receiver to malfunction due to data conflict. To ensure a reliable data transmission, it is required to establish a conflict avoidance mechanism for wireless communication transmission. A simple way to do this is to establish a unique address mapping table between transmitters and receivers. To be specific, the transmitters are allocated with different addresses, and the receivers distinguish different transmitters according to the addresses carried by the data transmitted by the transmitters. For example, it is required to establish an address mapping table between traditional wireless door locks and wireless concentrators in advance. The address mapping relational table records the address mapping relationships between the wireless door lock and the wireless concentrator required to communicate with such wireless door lock. In subsequent communications, multiple wireless door locks transmit data carrying addresses thereof to the corresponding wireless communication concentrators according to the address mapping table at a slot time, and the wireless communication concentrators can distinguish the source transmitter of each piece of data.

To overcome at least one defect existing in the prior art, it is a purpose of the present disclosure to propose a method of achieving free-pairing wireless door lock based on DIP switch which is intended to separate the software and hardware work at the implementation site, to ensure that the construction and subsequent maintenance will not be interrupted because of software pairing method or operation sequence, and thus to reduce the implementation cost and improve the implementation efficiency.

In a first aspect, the embodiments of the present disclosure provide a method of achieving free-pairing wireless door lock based on DIP switch which specifically includes the following steps.

Step 1, selecting for a wireless door lock a wireless chip that supports data modulation, in which case a data field of a transmission packet includes a lock address bit field and an area code field;

Step 2, providing a built-in multi-bit DIP switch for the wireless door lock in terms of hardware, in which case the multi-bit DIP switch is directly connected with an input pin of a central processing unit of the wireless door lock;

Step 3, installing an embedded software in the central processing unit of the wireless door lock;

Step 4, matching a DIP switch addresses with a room number during installation of the wireless door lock; and Step 5, reading, during powering up of the wireless door lock, a unique address code and a concentrator area code field that are set in advance, and sending to the wireless door lock reply data indicative of successful mapping, so that the wireless door lock shows through interaction that code matching is successful, in which case meaning the code matching is successful at end of the powering up of the wireless door lock.

In a second aspect, the embodiments of the present disclosure provide a wireless door lock. The wireless door lock includes a central processing unit, a multi-bit DIP switch and a wireless chip.

A plurality of pins of the multi-bit DIP switch are connected with a plurality of input pins of the central processing unit, respectively. The multi-bit DIP switch is configured to send, after being powered up, a current DIP switch address of the multi-bit DIP switch to the central processing unit.

The central processing unit is connected with the wireless chip. The central processing unit is configured to use, as a communication address, the DIP switch address acquired from the multi-bit DIP switch, and send, using the communication address via the wireless chip, a request for establishing communication to the wireless concentrator, so as to establish wireless communication with the wireless concentrator.

In a third aspect, the embodiments of the present disclosure provide a communicating method for a wireless door lock, applicable to a wireless door lock. The wireless door lock includes a central processing unit, a multi-bit DIP switch and a wireless chip. A plurality of pins of the multi-bit DIP switch are connected with a plurality of input pins of the central processing unit, respectively. The central processing unit is connected with the wireless chip. The method includes steps of:

the multi-bit DIP switch sending a current DIP switch address of the multi-bit DIP switch to the central processing unit, after being powered up; and the central processing unit using, as a communication address, the DIP switch address acquired from the multi-bit DIP switch, and sending, by using the communication address via the wireless chip, a request for establishing communication to the wireless concentrator, so as to establish wire communication with the wireless concentrator.

DETAILED DESCRIPTION

The technical solutions provided in the embodiments of the present disclosure will be clearly and completely described below with reference to the drawings associated with the embodiments of the present disclosure. Apparently, the described embodiments are merely some but not all of the embodiments of the present disclosure.

Hence, the following detailed description of the embodiments of the present disclosure provided in the figures is not intended to limit the scope of the disclosure as claimed, but merely shows the selected embodiments of the present disclosure. All the other embodiments obtained by those ordinarily skilled in the art based on the embodiments provided in the present disclosure without paying creative efforts shall fall within the scope of protection of the present disclosure.

It should be noted that similar reference signs and letters refer to similar items in the following figures. Therefore, once an item is defined in one figure, it will not be further defined or explained in the following figures.

It should be noted that in the description of the present disclosure, terms such as "first", "second" and "third" are only used for distinctive purpose, and cannot be construed as indicating or implying relative importance. It should also be noted that, in the present disclosure, terms like "provide", "mount", "coupled" and "connected" should be interpreted in a broad sense, unless otherwise explicitly specified and defined. For example, a connection could be fixed, detachable, or integrated, or it could be mechanical or electrical, or it could be direct or done via an intermediate medium, or it could be internal communication between two elements. Those ordinarily skilled in the art would understand the specific meanings of the above terms in the present disclosure according to specific circumstances.

The inventor found in the study that in traditional wireless door locks, the address of a wireless door lock is configured by software, which requires to be set in advance in a complex way, so as to be used as a local communication address of the wireless door lock.

In view of this, the embodiment provides a solution of achieving free-pairing wireless door lock based on DIP switch. The solution provided by the embodiment will be described in detail below.

Figure 1:
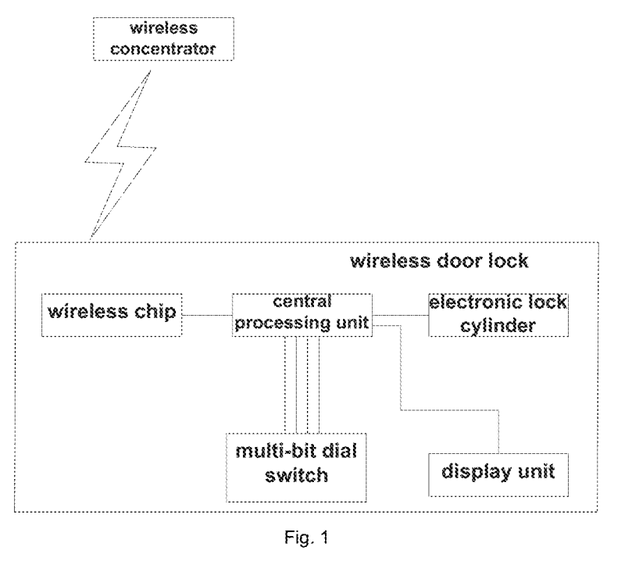
FIG. 1 is a schematic diagram of the functional modules of a wireless door lock provided by an embodiment of the present disclosure.

Referring to FIG. 1, FIG. 1 is a schematic diagram of a wireless door lock provided by the embodiment. The wireless door lock includes a central processing unit (also referred to as CPU in the embodiment), a multi-bit DIP switch and a wireless chip.

Figure 2:
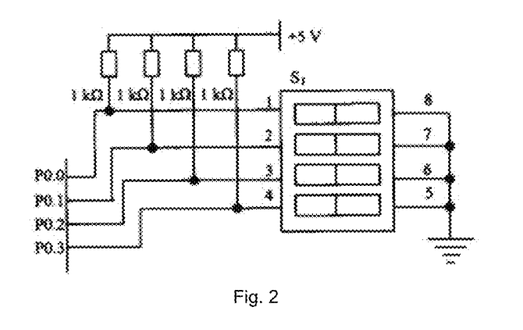
FIG. 2 is a schematic diagram of a multi-bit DIP switch provided by an embodiment of the present disclosure.

A plurality of pins of the multi-bit DIP switch are connected with a plurality of input pins of the central processing unit, respectively. The multi-bit DIP switch is configured to send a current DIP switch address of the multi-bit DIP switch to the central processing unit after being powered up. For example, referring to FIG. 2, FIG. 2 is a schematic diagram of the connections between the multi-bit DIP switch having 4 address bits and the central processing unit. Specifically, P0.0 to P0.3 shown in FIG. 2 are the input pins of the central processing unit, and S1 shown in FIG. 2 is the multi-bit DIP switch. The level of the input pins of the central processing unit can be pulled up by 5V power when the lock address bit corresponding to the multi-bit DIP switch are not grounded, namely, when value of the lock address bit is 1. The level of the input pins of the central processing unit may also be pulled down when the lock address bit corresponding to the multi-bit DIP switch is grounded, namely, when the value of the lock address bit is 0. This enables the DIP switch address formed by the combination of the current status of various address bits to be sent to the central processing unit after powering up the multi-bit DIP switch.

The central processing unit is connected with the wireless chip. The central processing unit is configured to use, as a communication address, the DIP switch address acquired from the multi-bit DIP switch, and send, using such communication address via the wireless chip, a request for establishing communication to the wireless concentrator, so as to establish wireless communication with the wireless concentrator. For example, the central processing unit converts a binary DIP switch address according to the order and status of various address bits, and then the converted binary DIP switch address is used as a communication address.

Specifically, in the present embodiment, different wireless communication concentrators have different area codes.

The DIP switch address comprises a plurality of address bits. The central processing unit is configured to use, as lock address bits of the wireless door lock, values of the address bits within a first preset range of the DIP switch address, and use, as an area code of the wireless concentrator, values of the address bits within a second preset range of the DIP switch address, the wireless concentrator needs to communicate with the wireless door lock.

When communicating with the wireless concentrator via the wireless chip, the central processing unit is configured to send to the wireless concentrator a communication data packet carrying the lock address bits and the area code, so that the wireless door lock uses the lock address bits as a local communication address to communicate with the wireless concentrator indicated by such area code.

Figure 3:
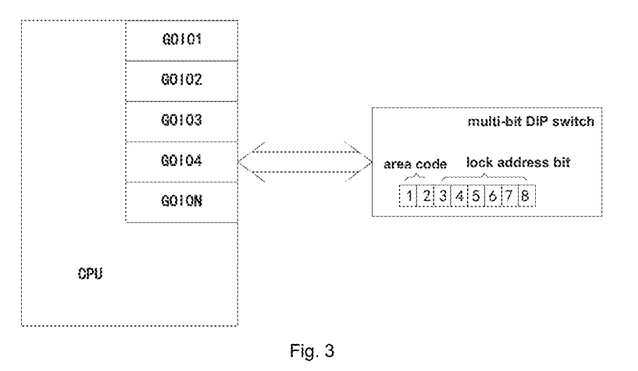
FIG. 3 is a schematic diagram of the central processing unit and the DIP switch of a wireless door lock provided by an embodiment of the present disclosure.
Figure 4:
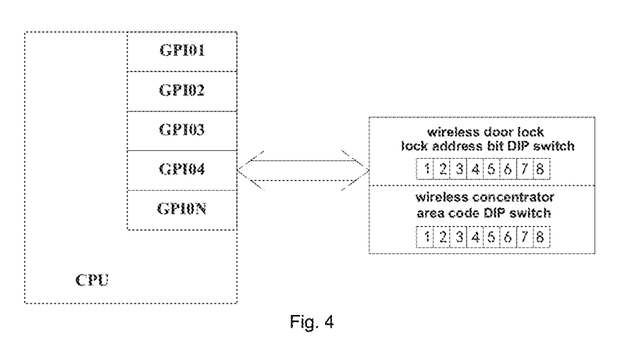
FIG. 4 is a schematic diagram of the central processing unit and the DIP switch of another wireless door lock provided by an embodiment of the present disclosure.

Referring to FIG. 3, in an example, the wireless door lock may include one multi-bit DIP switch including a plurality of address bits. For example, the wireless door lock may include one multi-bit DIP switch including 8 address bits. The address bits within the first preset range and the address bits within the second preset range do not overlap with each other of the DIP switch. For example, the 6 lower bits of the multi-bit DIP switch are address bits within the first preset range, whereas the 2 higher bits of the multi-bit DIP switch are address bits within the second preset range. In other words, the values of the 6 lower bits of the multi-bit switch represent the lock address bit of the wireless lock, whereas the values of the 2 higher bits of the multi-bit DIP switch represent the area code of the wireless concentrator which needs to communicate with the wireless door lock. Referring to FIG. 4, in another example, the wireless door lock may include a plurality of multi-bit DIP switches. For example, the wireless door lock may include two multi-bit DIP switches, each of the multi-bit DIP switches contains 8 address bits. The address bits within the first preset range and the address bits within the second preset range may be the portions of the plurality of multi-bit DIP switches, which portions do not overlap with each other. For example, the wireless door lock may include a multi-bit DIP switch A and a multi-bit DIP switch B. The address bits within the first preset range may be a plurality of address bits of the multi-bit DIP switch A, whereas the address bits within the second preset range may be a plurality of address bits of the multi-bit DIP switch B. For another example, the wireless door lock may include a multi-bit DIP switch C and a multi-bit DIP switch D. The address bits within the first preset range may include all the address bits of the multi-bit DIP switch C and the 4 lower bits of the multi-bit DIP switch D, whereas the address bits within the second preset range may include the 4 higher bits of the multi-bit DIP switch D.

It should be noted that the divisions of the first preset range and the second preset range are not limited to the above examples. The correspondence among the total address bits of the multi-bit DIP switch and the lock address bit as well as the area code are shown as following table.

| Number of input IO pins of CPU | Area code | Lock Address bit | Number of address bits | Total number of door locks |
|---|---|---|---|---|
| 8 | 2 | 6 | 8 | $2*(2^6) = 128$ |
| 16 | 8 | 8 | 16 | $8*(2^8) = 2048$ |
| N | N − M | M | N | $(N − M)*(2^M)$; $M < N$; preferably $M <= 8$ |

In view of the reality, a single wireless door lock cannot cover an infinite area, that is to say, there is an upper limit to the number of wireless door locks under the same area code. And it specifically depends on the transmission rate of wireless data and the critical distance of wireless coverage. Generally, in practice, 256 door locks are taken as the maximum unit. Assuming that 16 GPIO are used to identify the maximum address bit number, 2048 door locks in total are supported, which can satisfy the critical capacity of wireless door locks at the present stage.

Figure 5:
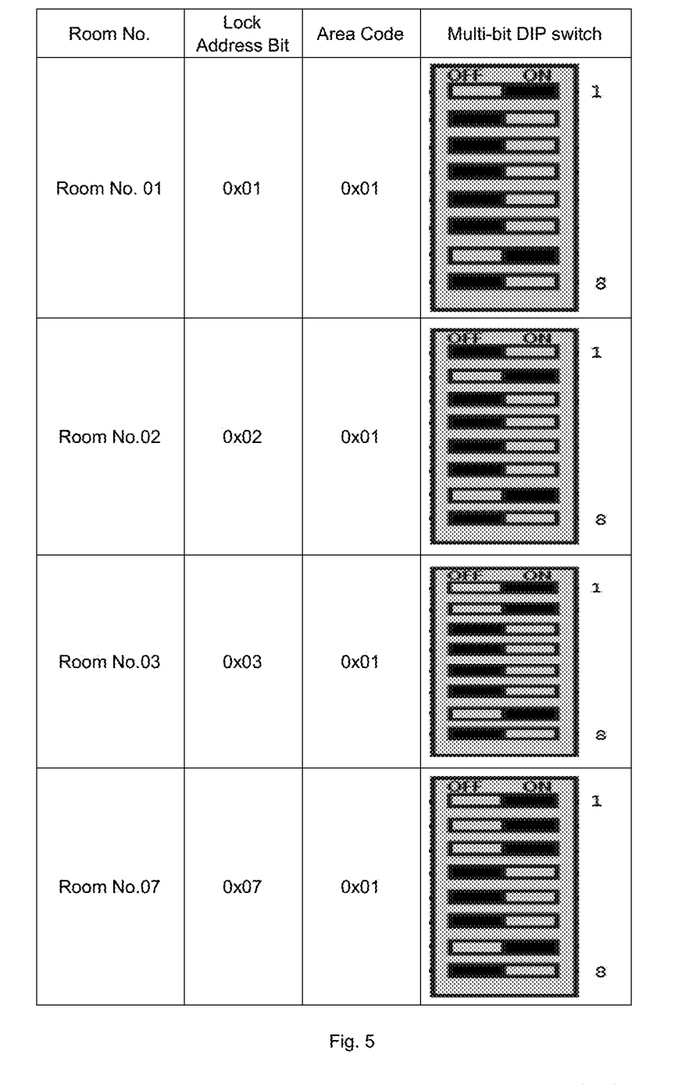
FIG. 5 is a schematic diagram of the DIP switch address of a wireless door lock provided by an embodiment of the present disclosure.

During the use of the wireless door lock provided by the embodiment, the lock address bit of the wireless door lock may be matched with the room number under which the wireless door lock is located. For example, referring to FIG. 5, wireless door lock No. 1 corresponds to room No. 01; the lock address bit of the address bit is set to be 0x01; and the lock address bit and the area code arranged in a certain order correspond to the address bits of the multi-bit switch. In the present example, the lock address bit is at higher bits, and the area code is at lower bits; the 8th bit and the 7th bit represent the area code bits; the 6th, 5th, 4th, 3rd, 2nd and 1st bits represent the lock address bit; the higher bits precede, whereas the lower bits follow; an 8-bit DIP switch can provide service for $2^6=64$ different wireless door locks and 4 wireless concentrators, and support 4 wireless concentrators and 128 wireless door locks at most.

After receiving the communication data packet sent by the wireless door lock, the wireless concentrator determines whether the area code carried in the communication data packet is consistent with the area code configured for the wireless concentrator, and if the area code carried in the communication data packet is consistent with the area code configured for the wireless concentrator, the wireless concentrator responds to the communication data packet.

Accordingly, in the present embodiment, the central processing unit is further configured to receive, via the wireless chip, an instruction data packet sent by the wireless concentrator. The instruction data packet carries the lock address bits of the wireless door lock. The central processing unit is configured to detect whether the lock address bits carried by the received instruction data packet are consistent with the lock address bits acquired from the multi-bit DIP switch, and if the lock address bits carried by the received instruction data packet are consistent with the lock address bits acquired from the multi-bit DIP switch, the central processing unit responds to the instruction data packet.

Figure 6:
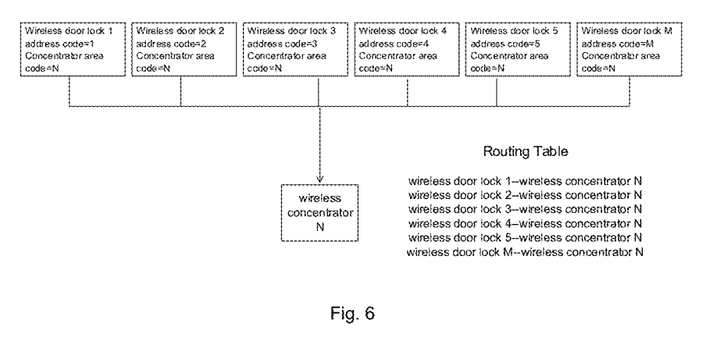
FIG. 6 is a schematic diagram showing the routing table information of a wireless door lock communication system provided by an embodiment of the present disclosure.

In the embodiment, the wireless concentrator may be configured therein with the mapping relationship between the lock address bits of the wireless door locks covered by the wireless concentrator and the area code of the wireless concentrator. For example, referring to FIG. 6, the wireless concentrator N may be configured therein with a routing table (i.e. a mapping table between the lock address bits and the area code). The routing table records the mapping table between the lock address bits (i.e. address codes) of the wireless door locks covered by the wireless concentrator and the code of the concentrator (i.e. the area code of the wireless concentrator).

Optionally, referring to FIG. 1 again, in the present embodiment, the wireless door lock also includes an electronic lock cylinder. The electronic lock cylinder is connected with the central processing unit. The central processing unit is further configured to control, at least based on the instruction data packet received from the wireless concentrator, the electronic lock cylinder to engage or disengage.

Optionally, referring to FIG. 1 again, in the present embodiment, the wireless door lock further includes a display unit. The display unit is connected with the central processing unit. The central processing unit is configured to control the display unit to show that the communication is successfully established when receiving, via the wireless chip, reply data indicative of successful mapping sent by the wireless concentrator in response to the request for establishing communication.

Optionally, in an example, the central processing unit is configured to: use, when the wireless door lock is powered up, as a communication address the DIP switch address acquired from the multi-bit DIP switch, and send, using the communication address via the wireless chip, a request for establishing communication to the wireless concentrator, so as to establish wireless communication with the wireless concentrator. That is to say, the central processing unit sends the request for establishing communication to the wireless concentrator when the wireless door lock is powered up. In this way, communication can be automatically established between the wireless door lock and the wireless concentrator without any other artificial control.

Optionally, in another example, the central processing unit is configured to: detect an action of the electronic lock cylinder; and use, if the action of the electronic lock cylinder meets a preset condition, as a communication address the DIP switch address acquired from the multi-bit DIP switch, and send, using the communication address via the wireless chip, a request for establishing communication to the wireless concentrator, so as to establish wireless communication with the wireless concentrator. Specifically, the central processing unit sends the request for establishing communication to the wireless concentrator when detecting that the electronic lock cylinder acts for preset times within a preset period of time. For example, the preset period of time may be set to be 3 seconds, and the preset times may be set to be 5 times. Namely, the central processing unit is configured to send the request for establishing communication to the wireless concentrator, when detecting that the electronic lock cylinder acts for 5 times within 3 seconds. In this way, the timing when the wireless door lock sends the request for establishing communication can be controlled without using any other elements.

The present embodiment also provides a communication method for a wireless door lock, applicable to the wireless door lock provided by the embodiment. The steps of the method will be described below.

Step S110, the multi-bit DIP switch sending a current DIP switch address of the multi-bit DIP switch to the central processing unit, after being powered up.

Step S120, the central processing unit using, as a communication address, the DIP switch address acquired from the multi-bit DIP switch, and sending, by using the communication address via the wireless chip, a request for establishing communication to the wireless concentrator, so as to establish a wireless communication with the wireless concentrator.

Optionally, in the present embodiment, different wireless communication concentrators have different area codes, and the DIP switch address includes a plurality of address bits.

The central processing unit uses, as lock address bits of the wireless door lock, values of the address bits within a first preset range of the DIP switch address, and uses, as an area code, values of the address bits within a second preset range of the DIP switch address.

The central processing unit sends, when communicating with the wireless concentrator via the wireless chip, to the wireless concentrator a communication data packet carrying the lock address bits and the area code, so that the wireless door lock uses the lock address bits as a local communication address to communicate with the wireless concentrator indicated by the area code.

The wireless concentrator determines, after receiving the communication data packet sent by the wireless door lock, whether the area code carried in the communication data packet is consistent with the area code configured for the wireless concentrator and responds, if the area code carried in the communication data packet is consistent with the area code configured for the wireless concentrator, to the communication data packet.

Accordingly, in the present embodiment, the central processing unit receives, via the wireless chip, an instruction data packet sent by the wireless concentrator. The instruction data packet carries address bits of the wireless door lock which are made in responding to the instruction data packet. The central processing unit detects whether the lock address bits carried by the received instruction data packet are consistent with the lock address bits acquired from the multi-bit DIP switch, and responds, if the lock address bits carried by the received instruction data packet are consistent with the lock address bits acquired from the multi-bit DIP switch, to the instruction data packet.

Optionally, in the present embodiment, the central processing unit may also control, according to the instruction data packet received from the wireless concentrator, the electronic lock cylinder to engage or disengage.

Optionally, in the present embodiment, the central processing unit may control the display unit to prompt that the communication is successfully established, when receiving, via the wireless chip, reply data indicative of successful mapping sent by the wireless concentrator in response to the request for establishing communication.

Optionally, in an example, the central processing unit is configured to: use, when the wireless door lock is power up, as a communication address the DIP switch address acquired from the multi-bit DIP switch; and send, using the communication address via the wireless chip, a request for establishing communication to the wireless concentrator, so as to establish wireless communication with the wireless concentrator.

Optionally, in another example, the central processing unit is configured to: detect the action of the electronic lock cylinder; and use, if the action of the electronic lock cylinder meets the preset condition, as a communication address the DIP switch address acquired from the multi-bit DIP switch, and send, using the communication address via the wireless chip, a request for establishing communication to the wireless concentrator, so as to establish wireless communication with the wireless concentrator. Specifically, the central processing unit is configured to send the request for establishing communication to the wireless concentrator, when detecting that the electronic lock cylinder acts for preset times within a preset period of time.

For the wireless door lock provided by the present embodiment, the present embodiment also provides a method of achieving free-pairing wireless door lock based on DIP switch. The method includes the following steps.

Step 1, selecting for a wireless door lock a wireless chip that supports data modulation, in which case the data field of a transmission packet includes the lock address bit field and the area code field;

Step 2, providing a built-in multi-bit DIP switch for the wireless door lock in terms of hardware, in which case the multi-bit DIP switch is directly connected with the input pin of the central processing unit of the wireless door lock;

Step 3, installing an embedded software in the central processing unit of the wireless door lock, in which case the embedded software supports the following procedures:

a) detecting an initial status of the set bit of the multi-bit DIP switch during the powering up of the wireless door lock;

b) recording encoding of the switch from higher bits to lower bits; and c) mapping the encoding of the switch directly to the lock address bit field and the corresponding wireless concentrator area code field carried in the wireless data;

Step 4, matching the DIP switch address with the room number during the installation of the wireless door lock, and it is acceptable as long as there are no identical numbers in the system;

Step 5, reading, during powering up of the wireless door lock, the unique address code and the concentrator area code field that are set in advance, and sending to the wireless door lock a reply data indicative of successful mapping, so that the wireless door lock shows through interaction that code matching is successful, meaning the code matching is successful at the end of the powering up of the wireless door lock.

Specifically, the routing table information is stored only in the wireless concentrator, and in not stored in the wireless door lock, the same to the address field and the concentrator area code field, and thus will not be lost after reboot.

Specifically, during implementation of the wireless door lock, the wireless door lock, due to malfunction, needs to be replaced, which is completed by correspondingly duplicating the respective lock address bit field and the respective concentrator area code field, which are provided for the DIP switch, so as to complete matching of the concentrator upon the powering up.

It should be noted that in the present embodiment, the wireless door lock refers to a wireless door lock which is powered by a battery and is capable of networking and command interaction. Pairing refers to establishing mapping relation between the communication codes of a wireless door lock and a wireless communication device.

Based on the design provided by the present embodiment, it is possible to separate the software and hardware work at the implementation site, to ensure that the construction and subsequent maintenance will not be interrupted because of software pairing method or operation sequence, and thus to reduce the implementation cost, improve the implementation efficiency, and break the limit on the number of DIP switch.

In view of the reality, a single wireless door lock cannot cover an infinite area, that is to say, there is an upper limit to the number of wireless door locks under the same area code. And it specifically depends on the transmission rate of wireless data and the critical distance of wireless coverage. For example, in practice, 256 door locks are taken as the maximum unit. Assuming that 16 GPIO are used to identify the maximum address bit number, 2048 door locks in total are supported, which can totally satisfy the critical capacity of wireless door locks at the present stage.

In the present embodiment, wireless door lock No. 1 corresponds to room No. 01; the lock address bit of the address bit is set to be 0x01; and the lock address bit and the area code arranged in a certain order correspond to the address bits of the multi-bit switch. In the present example, the lock area code is the first bits, and the lock code is the latter bits; the 8th bit and the 7th bit represent the area code bits; the 6th, 5th, 4th, 3rd, 2nd and 1st bits represent the lock address bit; the higher bits precede, whereas the lower bits follow; an 8-bit DIP switch can provide service for 2^6=64 different wireless door locks and 4 wireless concentrators, and support 4 wireless concentrators and 128 wireless door locks at most.

It will be appreciated that, the method of achieving free-pairing wireless door lock based on DIP switch, the wireless door lock and the communication method for the wireless door lock provided by the embodiments of the present disclosure can also be applied to the SMD (Surface Mount Technology) switch.

It will be appreciated that the devices and methods disclosed by the embodiments of the present disclosure may also be implemented in other ways. The device embodiments described above are merely illustrative. For example, the flow charts and block diagrams in the figures show the architectures, functions and operations possibly implemented by the device, method and computer program product according to many embodiments of the present disclosure. In this regard, each block of the flow charts or block diagrams may represent a module, a program segment or a part of code which contains executable instructions configured to execute designated logical functions. It should also be noted that in some alternative implementations, the functions illustrated in the blocks may also happen in an order different from that indicated in the figures. For example, two consecutive blocks can actually be carried out in parallel, or they may be carried out in a reverse order, depending on the functions involved. It should also be noted that each block of the block diagrams and/or flow charts and the combination of the blocks of the block diagrams and/or flow charts may be implemented by a dedicated hardware-based system which execute designated functions or actions, or may be implemented by the combination of dedicated hardware and computer instructions.

In addition, the functional modules in the embodiments of the disclosure may integrate to form an independent part, or they may be present independently, or two or more modules may integrate to form an independent part.

The functions may be stored in a computer readable storage medium if implemented as software function modules and sold or used as independent products. Based on such understanding, the technical solution in essence or the part of the present disclosure that contributes to the prior art or a part of the technical solution may be embodied by software products. The computer software products are stored in a storage medium, and include several instructions for a computer device (which may be e.g. a personal computer, a server or a network device) to perform all or part of the steps of the method described by the various embodiments of the present disclosure. And the aforementioned storage medium includes USB flash disk, Read-Only Memory (ROM), Random Access Memory (RAM), magnetic disk or optical disk which may store program codes.

The present disclosure provides at least the following beneficial effects. The method of achieving free-pairing wireless door lock based on DIP switch described herein is intended to separate the software and hardware work at the implementation site, to ensure that the construction and subsequent maintenance will not be interrupted because of software pairing method or operation sequence, and thus to reduce the implementation cost and improve the implementation efficiency.

The above description merely illustrates the preferred embodiments of the present disclosure, but the scope of protection of the present disclosure is not limited thereto. Any skilled ones familiar with the art could make equivalent replacements or changes according to the technical solutions of the present disclosure and the inventive concept within the technical scope disclosed herein, and such equivalent replacements or changes shall be encompassed by the scope of protection of the present disclosure.

INDUSTRIAL APPLICABILITY

The method of achieving free-pairing wireless door lock based on DIP switch described herein is intended to separate the software and hardware work at the implementation site, to ensure that the construction and subsequent maintenance will not be interrupted because of software pairing method or operation sequence, and thus to reduce the implementation cost and improve the implementation efficiency.

What is claimed is:

1. A wireless door lock, comprising a central processing unit, a multi-bit DIP (Double In-line Package) switch and a wireless chip,
   wherein a plurality of pins of the multi-bit DIP switch are connected with a plurality of input pins of the central processing unit, respectively, and the multi-bit DIP switch is configured to send, after being powered up, a current DIP switch address of the multi-bit DIP switch to the central processing unit; and
   the central processing unit is connected with the wireless chip, and the central processing unit is configured to use, as a communication address, the DIP switch address acquired from the multi-bit DIP switch and send, using the communication address via the wireless chip, a request for establishing communication to a wireless concentrator, so as to establish wireless communication with the wireless concentrator,
   wherein the wireless door lock further comprises an electronic lock cylinder connected with the central processing unit, the central processing unit is configured to: detect an action of the electronic lock cylinder; and use, if the action of the electronic lock cylinder meets a preset condition, as a communication address the DIP switch address acquired from the multi-bit DIP switch, and send, using the communication address via the wireless chip, a request for establishing communication to the wireless concentrator, so as to establish wireless communication with the wireless concentrator.

2. The wireless door lock according to claim 1, wherein different wireless concentrators have different area codes;
the DIP switch address comprises a plurality of address bits, the central processing unit is configured to use, as lock address bits of the wireless door lock, values of the address bits within a first preset range of the DIP switch address, and use, as an area code, values of the address bits within a second preset range of the DIP switch address;
when communicating with the wireless concentrator via the wireless chip, the central processing unit is configured to send to the wireless concentrator a communication data packet carrying the lock address bits and the area code, so that the wireless door lock uses the lock address bits as a local communication address to communicate with the wireless concentrator indicated by the area code;
after receiving the communication data packet sent by the wireless door lock, the wireless concentrator determines whether the area code carried by the communication data packet is consistent with the area code configured for the wireless concentrator, wherein if the area code carried by the communication data packet is consistent with the area code configured for the wireless concentrator, the wireless concentrator responds to the communication data packet.

3. The wireless door lock according to claim 2, wherein the central processing unit is further configured to receive, via the wireless chip, an instruction data packet sent by the wireless concentrator, the instruction data packet carries the lock address bits of the wireless door lock, the central processing unit is configured to detect whether the lock address bits carried by the received instruction data packet are consistent with the lock address bits acquired from the multi-bit DIP switch, wherein if the lock address bits carried by the received instruction data packet are consistent with the lock address bits acquired from the multi-bit DIP switch, the central processing unit responds to the instruction data packet.

4. The wireless door lock according to claim 3, wherein the wireless door lock further comprises an electronic lock cylinder, the electronic lock cylinder is connected with the central processing unit, and the central processing unit is further configured to control, at least based on the instruction data packet received from the wireless concentrator, the electronic lock cylinder to engage or disengage.

5. The wireless door lock according to claim 1, wherein the wireless door lock further comprises a display unit, and the display unit is connected with the central processing unit;
the central processing unit is configured to control the display unit to show that the communication is successfully established, when receiving, via the wireless chip, reply data indicative of successful mapping sent by the wireless concentrator in response to the request for establishing communication.

6. The wireless door lock according to claim 1, wherein the central processing unit is configured to: use, when the wireless door lock is powered up, as a communication address the DIP switch address acquired from the multi-bit DIP switch; and send, using the communication address via the wireless chip, a request for establishing communication to the wireless concentrator, so as to establish wireless communication with the wireless concentrator.

7. The wireless door lock according to claim 1, wherein the central processing unit is configured to send the request for establishing communication to the wireless concentrator, when detecting that the electronic lock cylinder acts for preset times within a preset period of time.

8. A communicating method for a wireless door lock, applicable to a wireless door lock, wherein the wireless door lock comprises a central processing unit, a multi-bit DIP switch and a wireless chip, a plurality of pins of the multi-bit DIP switch are connected with a plurality of input pins of the central processing unit, respectively, the central processing unit is connected with the wireless chip, and the method comprises steps of:
the multi-bit DIP switch sending a current DIP switch address of the multi-bit DIP switch to the central processing unit, after being powered up; and
the central processing unit using, as a communication address, the DIP switch address acquired from the multi-bit DIP switch, and sending, by using the communication address via the wireless chip, a request for establishing communication to a wireless concentrator, so as to establish wireless communication with the wireless concentrator,
wherein the wireless door lock further comprises an electronic lock cylinder connected with the central processing unit, the step of the central processing unit using as a communication address the DIP switch address acquired from the multi-bit DIP switch and sending by using the communication address via the wireless chip a request for establishing communication to a wireless concentrator comprises:
the central processing unit detecting an action of the electronic lock cylinder, and using, if the action of the electronic lock cylinder meets a preset condition, as a communication address the DIP switch address acquired from the multi-bit DIP switch, and sending, by using the communication address via the wireless chip, a request for establishing communication to the wireless concentrator, so as to establish wireless communication with the wireless concentrator.

9. The communicating method for a wireless door lock according to claim 8, wherein different wireless concentrators have different area codes, and the DIP switch address comprises a plurality of address bits; and
the step of the central processing unit using as a communication address the DIP switch address acquired from the multi-bit DIP switch and sending by using the communication address via the wireless chip a request for establishing communication to a wireless concentrator comprises:
the central processing unit using, as lock address bits of the wireless door lock, values of the address bits within a first preset range of the DIP switch address, and using, as an area code, values of the address bits within a second preset range of the DIP switch address;
the central processing unit sending, when communicating with the wireless concentrator via the wireless chip, to the wireless concentrator a communication data packet carrying the lock address bits and the area code, so that the wireless door lock uses the lock address bits as a local communication address to communicate with the wireless concentrator indicated by the area code; and
the wireless concentrator determining, after receiving the communication data packet sent by the wireless door lock, whether the area code carried in the communication data packet is consistent with the area code configured for the wireless concentrator, and responding, if consistent, to the communication data packet.

10. The communicating method for a wireless door lock according to claim 9, wherein the method further comprises:
the central processing unit receiving, via the wireless chip, an instruction data packet sent by the wireless concentrator, wherein the instruction data packet carries the lock address bits of the wireless door lock, which need to respond to the instruction data packet, and the central processing unit detecting whether the lock address bits carried in the received instruction data packet are consistent with the lock address bits acquired from the multi-bit DIP switch, and responding to the instruction data packet, if the lock address bits carried in the received instruction data packet are consistent with the lock address bits acquired from the multi-bit DIP switch.

11. The communicating method for a wireless door lock according to claim 10, wherein the wireless door lock further comprises an electronic lock cylinder, the electronic lock cylinder is connected with the central processing unit, and the method further comprises: the central processing unit controlling the electronic lock cylinder to engage or disengage, according to the instruction data packet received from the wireless concentrator.

12. The communicating method for a wireless door lock according to claim 8, wherein the wireless door lock further comprises a display unit, the display unit is connected with the central processing unit, and the method further comprises:
the central processing unit controlling the display unit to prompt that the communication is successfully established, when receiving, via the wireless chip, reply data indicative of successful mapping sent by the wireless concentrator in response to the request for establishing communication.

13. The communicating method for a wireless door lock according to claim 8, wherein the step of the central processing unit using as a communication address the DIP switch address acquired from the multi-bit DIP switch and sending by using the communication address via the wireless chip a request for establishing communication to a wireless concentrator comprises:
the central processing unit using, as a communication address, the DIP switch address acquired from the multi-bit DIP switch, and sending, by using the communication address via the wireless chip, a request for establishing communication to the wireless concentrator so as to establish wireless communication with the wireless concentrator, when the wireless door lock is powered up.

14. The communicating method for a wireless door lock according to claim 8, wherein the central processing unit is configured to send the request for establishing communication to the wireless concentrator, when detecting that the electronic lock cylinder acts for preset times within a preset period of time.

* * * * *